US00RE39604E

(19) United States
(12) Reissued Patent
Watkins

(10) Patent Number: US RE39,604 E
(45) Date of Reissued Patent: May 1, 2007

(54) SEATING ARRANGEMENT

(75) Inventor: Mervyn M. Watkins, Rancho Palos Verdes, CA (US)

(73) Assignee: Convaid Products, Inc., Torrance, CA (US)

(21) Appl. No.: 09/967,752

(22) Filed: Sep. 28, 2001

Related U.S. Patent Documents

Reissue of:
(64) Patent No.: 5,957,532
Issued: Sep. 28, 1999
Appl. No.: 08/417,738
Filed: Apr. 5, 1995

(51) Int. Cl.
*A47C 7/22* (2006.01)

(52) U.S. Cl. ..... 297/284.2; 297/452.63
(58) Field of Classification Search ..... 297/284.1, 297/284.2, 284.3, 452.63, 452.64
See application file for complete search history.

(56) References Cited

U.S. PATENT DOCUMENTS 2,934,134 A * 4/1960 Adler ..... 297/452.64
3,645,550 A * 2/1972 Biehl ..... 297/452.56
4,057,291 A * 11/1977 Dubinsky ..... 297/440.11
4,858,992 A * 8/1989 LaSota ..... 297/452.63

* cited by examiner

*Primary Examiner*—Peter R. Brown
(74) *Attorney, Agent, or Firm*—Greenberg Traurig, LLP; Christopher Darrow

(57) ABSTRACT

An improved seating arrangement having a pair of rigid sides which include a back portion and a seat portion. Flexible webbing members extend between the rigid sides in the back and seat portions. Various arrangements are provided for increasing and decreasing the length and tension of the flexible webbing to provide a three dimensional variation in the contour of the flexible webbing in the back and/or seat portion.

45 Claims, 14 Drawing Sheets

FIG. 1
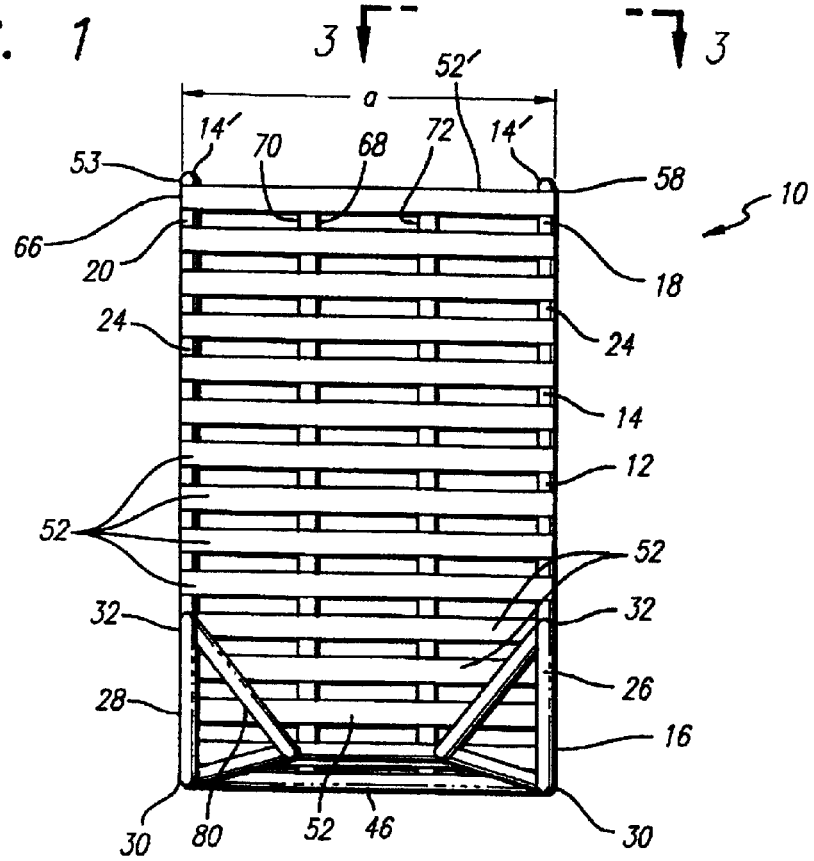
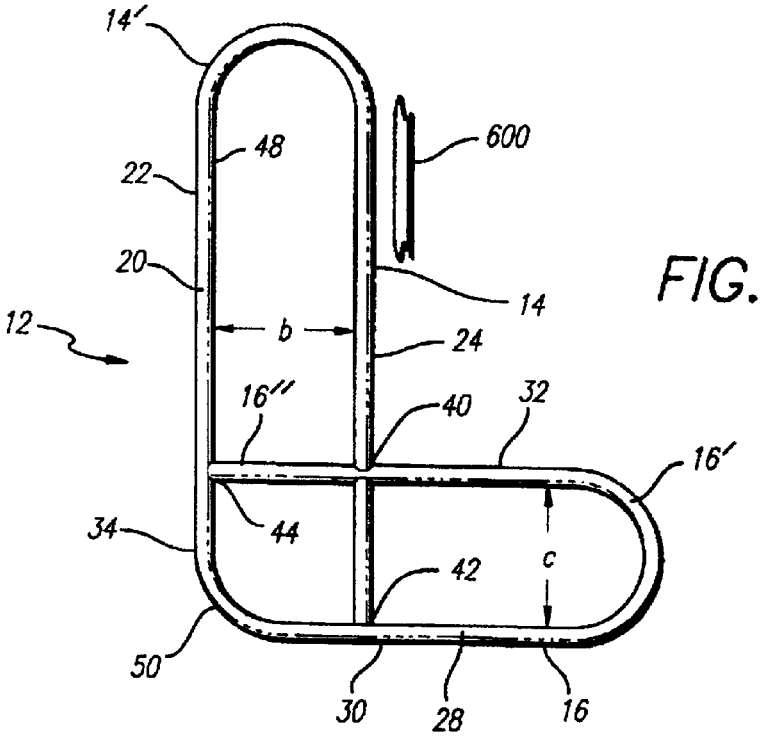
FIG. 2

FIG. 4A
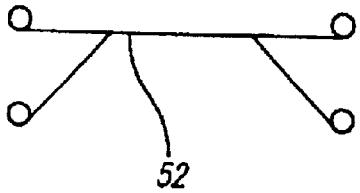
FIG. 4B
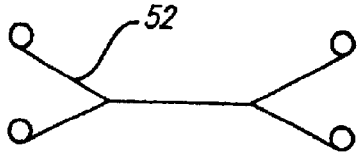
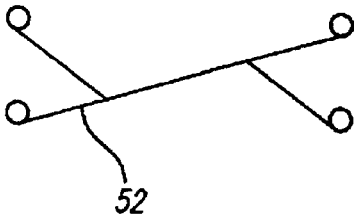
FIG. 4D
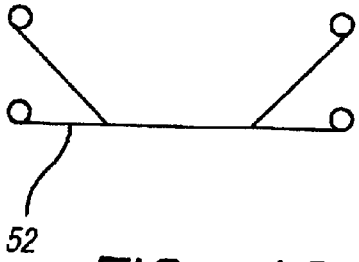
FIG. 4C
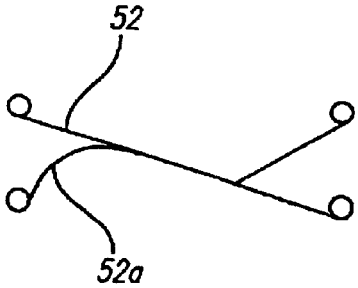
FIG. 5A
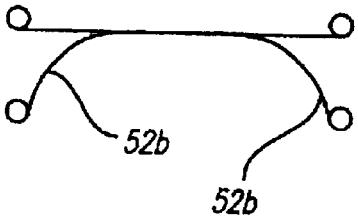
FIG. 5B FIG. 6
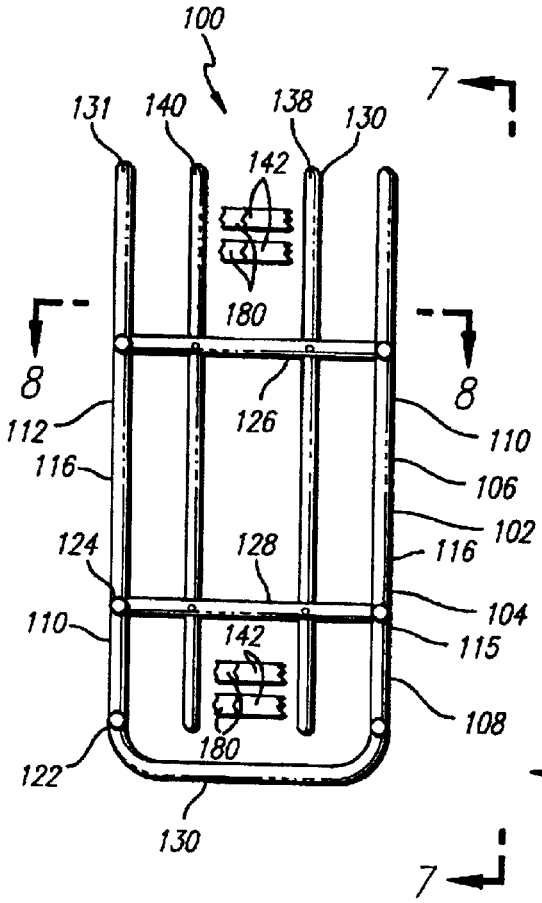
FIG. 7
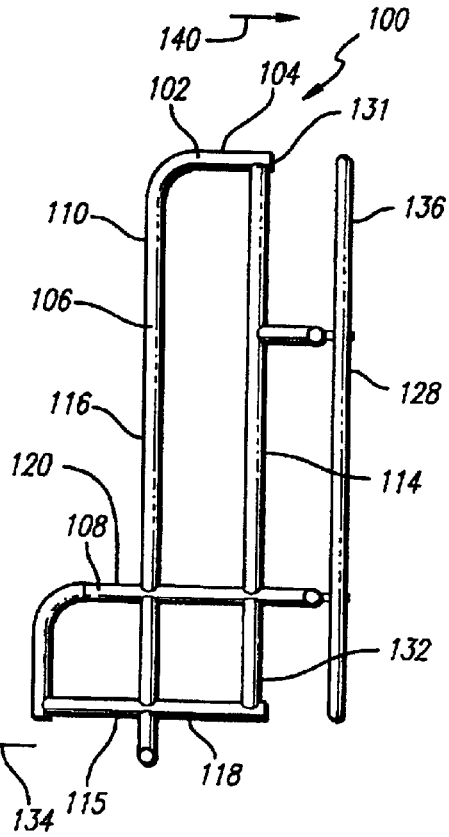
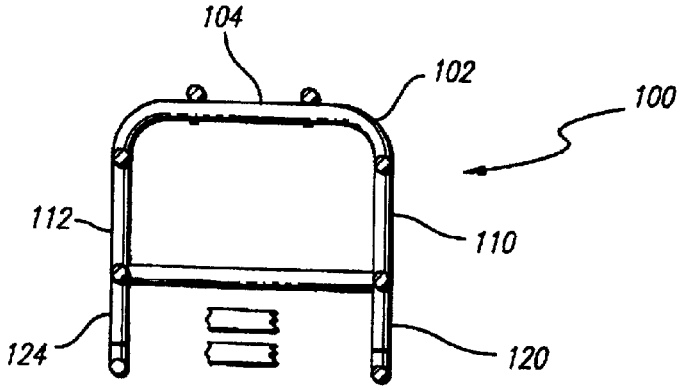
FIG. 8

SEATING ARRANGEMENT

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to the seating art and more particularly to an improved adjustable seating arrangement particularly adapted for providing variable contour back and/or seat portion to accommodate various configurational deformities to the user.

2. Description of the Prior Art

Many persons, including both adults and children, are unfortunately afflicted with various disorders causing postural configuration abnormalities which vary from the normal configuration of persons not so afflicted. For example, many suffering from cerebral palsy or muscular dystrophy have their upper torso, and/or buttocks, and/or upper legs twisted or otherwise in configurations that can differ considerably from the generally planer array generally associated with those same portions of the anatomy of persons not so afflicted. The distortions from the planar array can vary throughout the length of each of the body portions so that, for example, a chair back or chair seat having a single variation from the planar extending throughout the extent thereof cannot provide the desired support throughout the extent of each body portion.

There have heretofore been provided various adjustable seating arrangements which attempt to provide seating arrangements for such unfortunately disabled people. For example, in U.S. Pat. No. 4,367,897 there is shown a seating arrangement having a matrix of hard plastic elements connected to rigid tubular elements within a frame. Tensioning means are provided in the matrix but the tensioning means are not connected to the frame. The tensioning means only apply tension through the ball elements to various of the tube elements. Such an arrangement is comparatively costly and cannot provide the desired seating comfort or convenient contour arrangement often desired.

In U.S. Pat. No. 3,088,773 there is shown a frame having spaced apart rigid elements to which the seating and back portions are attached. In this arrangement the transverse strips are elastic and the ties and flexible. Inner members between the frames are rigid metal. There is no provision for adjusting the tension and the ties are not directly connected to the transverse strips and contouring cannot be provided.

In U.S. Pat. No. 3,913,978 there is a rigid seat and back unit coupled to a frame. In some embodiments described therein there are buckles for attaching the frame to the seat back unit. However, there is no provision for providing the desired contour to match the various bodily contours for the disabled persons for whom such a seat is desired.

In U.S. Pat. No. 4,928,334 there is shown a fabric web which is elastic and utilized as a spring element in an upholstered article of furniture such as a seat or a bed and the elastic fabric web is joined to a rigid frame members. No adjustment of contours is shown.

U.S. Pat. No. 3,363,667 shows the structure for attaching a webbing to the frame of a tubular chair such as a lawn chair but does not provide any contour adjustment to either the seat or the back.

U.S. Pat. No. 3,188,662 shows a chair for convalescent persons and provides mechanical movement of the back relative to the seat. No adjustments for contour configuration are shown.

U.S. Pat. No. 4,077,669 shows a resilient seating arrangement but has no adjustments and no spaced apart frame members. U.S. Pat. No. 3,154,345 shows a chair construction apparently intended to be used near water on, for example, boats and ships, and preferably utilizes rectangular cross-section elements as the frame and has a series of interwoven web members connected to the frame. No contour adjustment is shown or suggested.

Other seating arrangements are shown, for example, in U.S. Pat. Nos. 4,544,614, 2,459,843 and 2,485,111. None of these patents shows or suggests the desired contour configuration adjustability.

Other prior art seating arrangements for such disabled persons generally consist of costly complex and cumbersome solid seat inserts with many mechanical adjustments or multiple pieces of foam applied to achieve the desired contour for each individual persons. Such units are difficult to transport and tend to lose their adjustment so that the contours do not remain constant for the person. An individual custom molded contour chair covered with a padded cover has also been utilized but such units are very costly and need significant lead time. Further, should the contours of the individual change, as they often do with many diseases, and/or as the size of a person increases such as when a child grows, the molded contour chair cannot accommodate the changes.

Accordingly, there has long been a need for a seating arrangement for handicapped persons wherein the seating arrangement can provide adjustable contours throughout the back portion and/or seat portion in one, two or three dimensions to accommodate a wide variety of configurational disabilities of a user and also allow for convenient changing of the contours as the need arises for any individual person.

SUMMARY OF THE INVENTION

It is an object of the present invention to provide an improved seating arrangement for disabled persons requiring configurational variations in the seat and/or back of the seating arrangement.

It is another object of the present invention to provide an improved seating arrangement for disabled persons in which adjustments to the contours of the back and/or seat may be quickly and easily made in one, two, or three dimensions.

It is yet another object of the present invention to provide a seating arrangement for disabled persons in which variations in the contours of the back and/or seat may be quickly and easily accomplished.

It is yet another object of the present invention to provide such a variable contour seating arrangement that is of sturdy construction, comparatively inexpensive to fabricate and adaptable for utilization with a wide variety of contour configurational requirements.

SUMMARY OF THE INVENTION

According to the principles of the present invention in a preferred embodiment thereof there is provided a frame member having a back portion and a seat portion. The back portion has a pair of spaced apart rigid support elements and each support element has a pair of rigid brace members in spaced apart relationship. The seat portion is also provided with a pair of spaced apart rigid support elements and each rigid support element of the seat portion has a pair of spaced apart rigid brace members. The rigid support elements of the seat portion are coupled to the lower part of the rigid support elements of the back portion. There is also provided a plurality of rigid transverse members extending between the rigid support elements of the back portion and also the seat portion to maintain the desired spacing therebetween.

A plurality of flexible webbing members are adjustably mounted on the rigid support elements of the back portion in a spaced apart array extending from the upper part to the lower part thereof adjacent the coupling to the seat portion. Each of the first plurality of flexible webbing members comprises a first and second flexible webbing portion and each end of the first flexible webbing portion is adjustably connected to the first of the pair of rigid brace members in each rigid support element and the second flexible webbing portion has its ends adjustably connected to the second rigid brace member of each of the first and second rigid support elements. Thus, for each of the first plurality of flexible webbing members there are provided four adjustment means; one at each of the rigid brace elements.

A plurality of joining means extend from regions adjacent the upper portion to regions adjacent the lower portion of the back member and the joining means are coupled to each of the adjacent first and second flexible webbing portions intermediate the first and second rigid support elements.

The first plurality of flexible webbing members and flexible back joining means are preferably fabricated from fabric such as nylon and are nonelastic.

The seat portion may similarly be provided with a second plurality of flexible webbing members in a spaced apart relationship extending from the inner end thereof which is connected to the back portion to the outer end and each of the second plurality of webbing members comprises a first and a second flexible webbing portion and each of said first and said second flexible webbing portions of said second plurality of flexible webbing members is substantially similar to the first and second flexible webbing portions of said first plurality of webbing members and are also provided with adjustment means at each of the third and the fourth rigid brace members of the third and fourth rigid support elements of the seat portion.

In preferred embodiments of the present invention the adjustment means for both the back portion and the seat portion are double "D" rings although, it will be appreciated, conventional buckles, hook and loop fasteners or the like may be provided for the adjustment. The adjustment means allows varying the length of each of the first and second webbing portions of the first plurality and second plurality of webbing members.

A pair of seat joining means substantially similar to the back joining means couple together the adjacent first and second flexible webbing portions of each of the plurality of the flexible webbing members in the seat portion.

Each of the flexible webbing members of the first plurality and second plurality thereof may be individually adjusted in length by suitable adjustment of the adjustment means and because of the four point attachment can provide a variable contour of each of the flexible webbing members thus provided a capability for a three dimensional contour variation throughout the extent of the back portion and the seat portion to accommodate a wide variety of configurational variations.

In other embodiments of the present invention, flexible strap means which may be flexible nylon webbing are provided to allow insertion of resilient pads to further provide contour adjustment and comfort to the seating arrangement.

BRIEF DESCRIPTION OF THE DRAWINGS

The above and other embodiments of the invention may be more fully understood from the following detailed description taken together with the accompanying drawings wherein similar reference characters refer to similar elements throughout and in which:

FIG. 1 is a front view of a seating arrangement according to the principles of the present invention;

FIG. 2 is a side elevational view of a frame member useful in the practice of the present invention;

FIGS. 4 and 5 illustrate some of the configurations, in schematic form, for the flexible webbing members in accordance with the principles of the present invention;

FIGS. 6, 7 and 8 illustrate another embodiment of the present invention;

DESCRIPTION OF THE PREFERRED EMBODIMENTS

Figure 3:
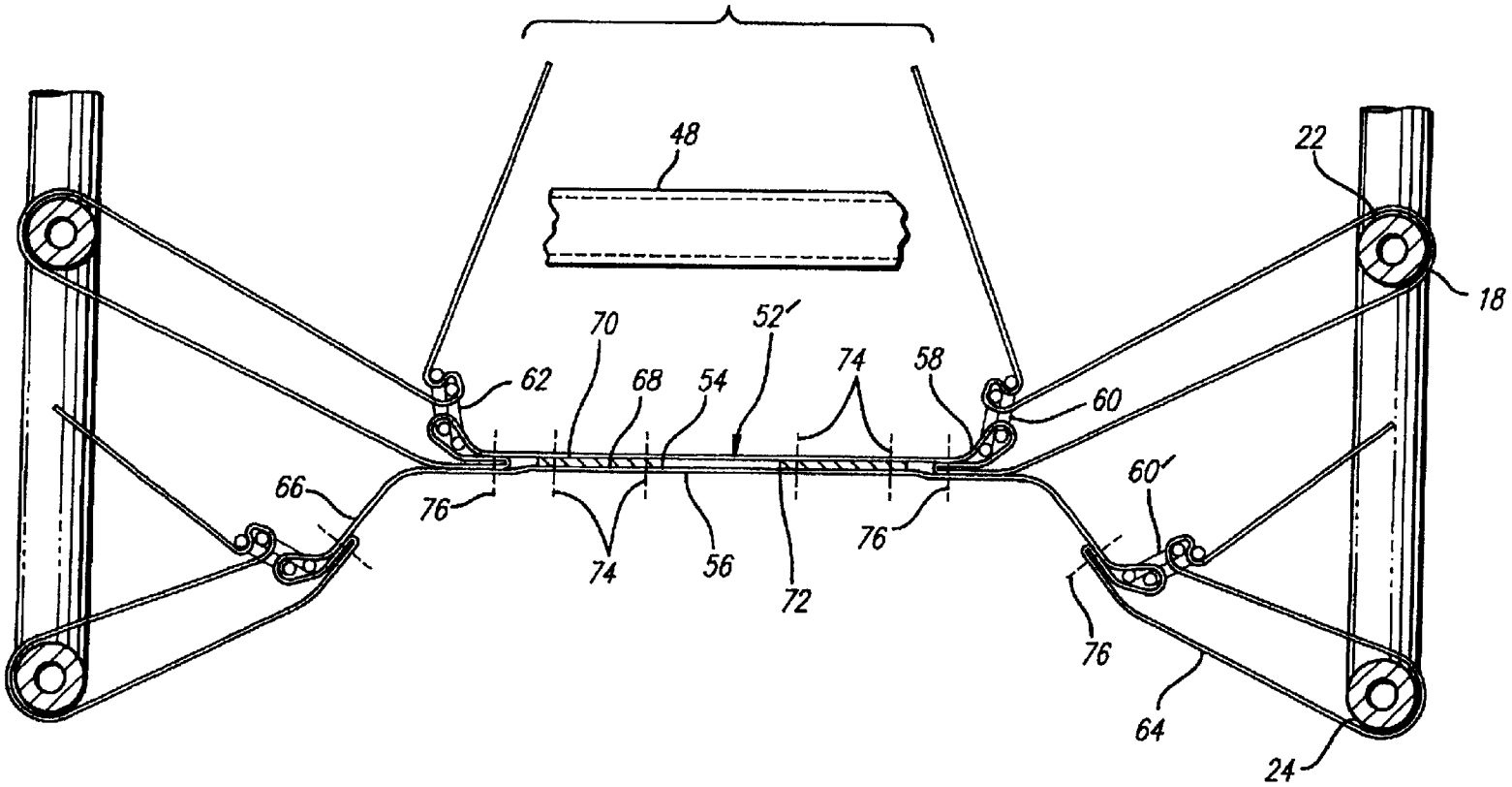
FIG. 3 is a view along the lines 3—3 of FIG. 1.

Referring now to the drawings there is illustrated in FIGS. 1, 2 and 3 a preferred embodiment generally designated 10 of the seating arrangement according to the principles of the present invention. The seating arrangement 10 is provided with a frame member generally designated 12 having a back portion generally designated 14 and a seating portion generally designated 16. The back portion 14 has a first and a second rigid support elements as indicated at 18 and 20 in spaced apart relationship as indicated by the letter "a" in FIG. 1. Each of the first and second rigid support elements 18 and 20 has a first and a second rigid brace member 22 and 24 in spaced apart, substantially parallel relationship as indicated by the letter "b" on FIG. 2. The first rigid brace member 22 and second rigid brace member 24 of each of the first and second rigid support elements 18 and 20 define a pair of spaced apart planes and, in preferred embodiments of the present invention, the plane defined by the first rigid support element 18 and second rigid support element 20 are substantially parallel and together define a seating back support.

The seat portion 16 of the frame member 12 generally comprises a third rigid support element 26 and a fourth rigid support element 28 and each of said third rigid support element 26 and fourth rigid support element 28 are in spaced apart relationship and preferably are spaced apart substantially the distance "a" indicated in FIG. 1. Each of the third rigid support element 26 and fourth rigid support element 28 comprise a third rigid brace member 30 and fourth rigid brace member 42 in spaced apart relationship indicated by the letter c on FIG. 2. The spacing c may be the same as the spacing b or it may be greater than the spacing b or less than the spacing b. The third rigid brace members 30 and fourth rigid brace members 32 of each of the third rigid support element 26 and fourth rigid support element 28 define a pair of planes and the planes defined thereby are substantially parallel.

The seat portion 16 is connected to the back portion 14 at a lower part generally designated 34 of the back portion. In preferred embodiments of the present invention the frame member 14 is generally comprised of tubular metal and the joining of the seat portion 16 to the back portion 14 as indicated at 40, 42 and 44 may be, for example, by welding. Alternatively, bonding by way of appropriate adhesive may also be utilized if desired. Similarly, other types of fastening such as nuts and bolts, threading engagement or the like may be provided in particular applications.

A plurality of rigid transverse members are utilized to maintain the frame 12 in the spaced relationship shown in FIGS. 1 and 2. Such rigid transverse members are indicated at FIG. 1 at 46 and in FIG. 2 at 48 and 50. The transverse members 46, 48 and 50 may be coupled to the rigid support elements 18 and 20 for the back portion 14 and 26 and 28 for the seat portion 16. The plurality of transverse members may be, for example, metallic tubing coupled to the frame 12 thereby maintaining the spacing as indicated by the letter "a."

In order to provide the desired variable contour of the seating arrangement 10 there is provided a first plurality of flexible webbing members generally designated 52 extending between the first rigid support element 18 and second rigid support element 20 for providing the variable contour to the back portion 14 of the seating arrangement 10, the first plurality of flexible webbing members 52 are in a spaced apart relationship from an upper part 53 of the back portion 14 to the lower part 34 of the back portion 14. The spacing between each of the flexible webbing members 52 may be selected as desired for particular applications as may the width of each of the flexible webbing members 52.

FIG. 3 is a view along the line 3—3 of FIG. 1 and illustrates the details of the first plurality of flexible webbing members 52 and in particular the first flexible webbing member 52' shown on FIG. 1. It will be appreciated, however, that many details of the interconnections of the flexible webbing member 52' and the other of the first plurality of flexible webbing members 52 are omitted from FIG. 1 for clarity.

As shown on FIG. 3 the flexible webbing member 52' has a first flexible webbing portion 54 and a second flexible webbing portion 56. FIG. 3 illustrates the connection of the flexible webbing member 52' to the first rigid support element 18 and the adjustable interconnection to the first rigid brace 22 and second rigid brace 24 of the first rigid support element 18. The curved top most portion 14' shown of FIG. 2 of the back portion 14 has been cut away in FIG. 3 for clarity so that the tubular nature of the first and second rigid brace members 22 and 24, respectively, may be seen. The adjustable connections shown on FIG. 3 are provided at each of the interconnections of one of the first flexible webbing members 52 to the first and second rigid support elements 18 and 20. The first flexible webbing portion 54 has a first end section generally designated 58 adjustably connected to the first brace member 22 of the first rigid support element 18. The adjustable connection is provided by the double "D" ring as indicated at 60. It will be appreciated, however, that other adjustable connections such as buckles, hook and loop fasteners or the like may be utilized to provide the desired adjustability of the present invention. The second end 62 of the first flexible webbing portion 54 is similarly connected through D rings to the first rigid brace 22 of the second rigid support member 20 by similar double "D" ring adjustability interconnections.

The second flexible webbing portion 56 has a first end 64 adjustably connected to the second rigid brace member 24 of the first rigid support element 18 by double "D" rings indicated at 60 ' which may be identical to the double "D" rings 60 described above. The second end 66 of the second flexible webbing portion 56 is similarly adjustably connected to the second rigid brace member 24 of the second rigid support element 20 by the indicated double "D" ring adjustment means.

Back joining means generally designated 68 are provided for joining together the adjacent first and second flexible webbing portions of each of the flexible webbing members 52. In the embodiment 10 illustrated in FIGS. 1, 2 and 3 there are a pair of back joining members 70 and 72. The back joining members 70 and 72 are coupled to the first and second flexible support portions 54 and 56.

In preferred embodiments of the present invention the flexible webbing members 52 and back joining members 70 and 72 are fabric and preferably a nylon webbing. For fabric and/or the nylon webbing structure, the first webbing portion 54, second webbing portion 56 and each of the back joining means 70 and 72 may be coupled together by sewing as indicated at 74. Similarly, the first and second webbing portions 54 and 56 may be coupled together in other locations such as indicated at 76 by sewing or the like. For the first flexible webbing members 52 and the back joining means 68 fabricated from materials which cannot be sewn, other connecting arrangements may be utilized such as bonding, heat sealing, stapling or similar structural arrangements well known in the art.

The seating portion 16 is provided with a second plurality of flexible webbing members generally designated 80 as shown on FIG. 1. The flexible webbing members 80 may be substantially similar to each of the first plurality of flexible webbing member 52 utilized in the back portion 14. In FIG. 1 the adjustment means for connecting the second plurality of flexible webbing members 80 to the third and fourth rigid support elements 26 and 28 are omitted for clarity. The second plurality of flexible webbing members are provided on the seat portion 16 in a spaced apart relationship between an outer portion 16' and an inner portion 16" of the seating portion 16 and the adjustment means for connecting the second plurality of flexible webbing members 80 to the seating portion 16 may be substantially the same as described above in connection with FIG. 3. As such, they may comprise double "D" rings, hook and loop, buckles or other adjustment means.

FIGS. 4 and 5 illustrate, in schematic form, some of the various contour configurations of the flexible webbing members 52 and/or 80 which may be achieved by varying the lengths of the first and second webbing portions thereof through the use of the adjustment means such as the double "D" rings 60. In FIG. 4, FIGS. 4A, 4B and 4C show symmetrical adjustment arrangements between the first and second rigid support elements and FIG. 4D shows a non-symmetrical arrangement. In FIG. 5 there is illustrated in FIGS. 5A and 5B configurations having one or more curved portions of the flexible webbing member 52 as illustrated at 52a and 52b such curved portions are achieved by leaving slack in the first and/or second webbing portions such that when a person occupies the seating arrangement 10 it is pulled taut and curved to fit the contour of the particular body portion pressed thereagainst. Thus, the adjustment means 60 and 60' in both the back portion 14 and seat portion 16 allows the plurality of flexible webbing members to be positioned in various configurations to conform to the desired contour for each individual. Such adjustment may be easily made by the use of the double "D" ring or other adjustment means and therefore the seating arrangement 10 can not only accommodate a large variety of different handicapped configurations of various bodily parts but also can be utilized for a large variety of different persons.

It will be appreciated that seat joining means similar to the back joining means 68 may be provided to couple together the first and second webbing portions of the second plurality of flexible webbing members 80 in a manner similar to that shown for the back joining means 68.

Referring now to FIGS. 6, 7, 8 and 9 there is shown another embodiment, generally designated 100 of a seating arrangement 102 according to the principles of the present invention. The seating arrangement 102 is comprised of a frame member 104 having a back portion 106 and a seat portion 108. The back portion 106 is generally similar to the back portion 14 of embodiment 10 described above and is comprised of a first rigid support element 110 and a second rigid support element 112 in, preferably, a parallel, spaced apart relationship. Each of the first rigid support element 110 and second rigid support element 112 has a first rigid brace member 114 and second rigid brace member 116 which, in preferred embodiments, are substantially parallel and coplanar and thus similar to the corresponding first and second rigid brace members described above in connection with embodiment 10.

The seat portion 108 is generally similar to the seat portion 16 described above and is comprised of a third rigid support element 115 and fourth rigid support element 116, which are generally similar to the third rigid support element 26 and fourth rigid support element 28 described above. The third rigid support element 115 has a first rigid brace member 188 and second rigid brace member 120 and the fourth rigid support element 116 has a first rigid brace 112 and a second rigid brace 124. In preferred embodiments the third rigid support element 115 and fourth rigid support element 116 are in spaced apart parallel relationship. The first rigid brace member 118 and second rigid brace member 120 are in spaced apart relationship and preferably in parallel coplanar relationship. Similarly, the first rigid brace 122 and second rigid brace 124 are in spaced apart relationship and preferably in parallel, coplanar relationship.

Transverse members 126 and 128 are provided to maintain the first rigid support element 110 and second rigid support element 112 of the back portion 106 in said spaced apart relationship and for other purposes as described below. Transverse member 130 is also provided to maintain the third rigid support element 114 and fourth rigid support element 116 in spaced apart relationship.

The back portion 106 has an upper part 131 and a lower part 132. The seat portion 108 is coupled to the back portion 106 in regions adjoining the lower part 132 and extends outwardly therefrom in the first direction indicated by arrow 134.

In preferred embodiments of the present invention, the frame 102 is metallic and the interconnections of the various portions thereof is by welding. It will be appreciated, however, that other structures for coupling the various components together may be utilized such as threading, bonding, unitary molding or the like.

In the embodiment 100 there is provided a fifth rigid support element 136 comprising a fifth rigid brace 138 and sixth rigid brace 140. The fifth rigid brace 138 and sixth rigid brace 140 are preferably parallel to each other and coplanar in a plane perpendicular to the planes defined by the first rigid support element 110 and the second rigid support element 112. The fifth rigid support element 130 is spaced from the first rigid support element 110 and second rigid support element 112 in a second direction indicated by the arrow 140 opposite the first direction 134 and is coupled to the transverse members 126 and 128.

A plurality of first flexible strap means 142 are provided in the back portion 106 of embodiment 100 and in a spaced array from regions adjacent the upper part 131 to regions adjacent the lower part 132 and extend between the first rigid support element 110 and second rigid support element 112.

Figure 9:
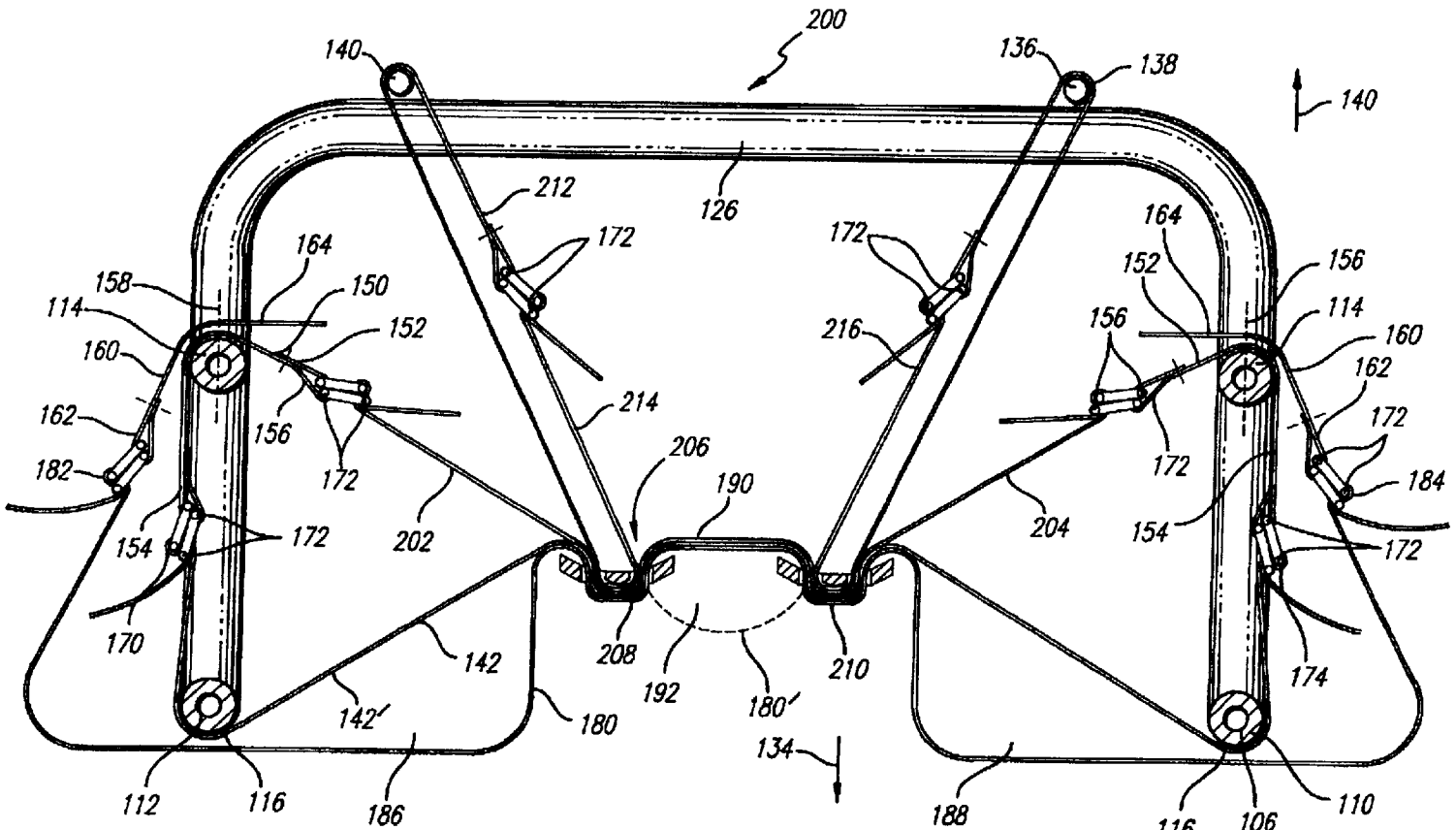
FIG. 9 illustrates, in schematic form, a webbing arrangement useful in the practice of the embodiment shown in FIGS. 6, 7 and 8.

The structure for providing the plurality of first flexible strap means is shown, generally schematically, in FIG. 9 for strap means 142' and such structure may be utilized for some or all of the strap means 142.

As shown in FIG. 9, there is provided a first plurality of flexible webbing connecting members generally designated 150 comprised of a plurality of pairs of first tab means 152 each having a first end 154 and second end 156. Each of the first tab means 152 are coupled as indicated at 158 to the adjacent first brace member 114 of each of first rigid support element 110 and second rigid support element 112. Rivets, bolts and nuts, bonding or other known fastening means may be utilized to connect the first tab means 152 to the rigid braces. As shown on FIG. 9, each of the first tab means 152 is connected at 158 to the first brace member intermediate the first end 154 and second end 156 of each of the tab means 152. The flexible webbing connecting members 150 also comprises a plurality of pairs of second tab means 160. Each of the second tab means 60 has a first end 162 and a second end 164. Each of the second tab means 160 are connected at their second end 164 to the rigid brace member 114 as indicated at 158.

As shown in FIG. 9 the first end 154 of tab 152 and first end 162 of tab 160 extend from the coupling 158 towards the first brace member 116. The first tab means 152 and second tab means 160 may be fabricated from nylon webbing or any other desired material suitable for the purpose.

Each of the first flexible strap means 142 has a first end 170 adjustably connected by a pair of "D" rings 172 to one of the first end 154 of a pair of the first tab means 152 and a second end 174 adjustably connected to the first end 154 of the other of the pair of first tab means 152 by double "D" rings 172. The first flexible strap means 142 which may also be fabricated of nylon webbing or other suitable material, extends around each of the second rigid brace members 116 in the first direction 134 therefrom.

A second plurality of flexible strap means 180 are also provided. In preferred embodiments of the present invention there is one flexible strap means 180 for each flexible strap means 142. The flexible strap means 180 is shown on FIG. 9 in a "slack" condition in order to illustrate the principles of the present invention. The flexible strap means 180 overlies the adjacent flexible strap means 142 and each have a first end 182 adjustably connected to the first end 162 of one of the pair of second tab means 160 by double "D" rings 172, and a second end 184 adjustably connected to the first end 162 of the other of said pair second tab means 160 by double "D" rings 172.

If desired, resilient pads 184 may be placed between first flexible strap means 142 and second flexible strap means 180 in regions indicated at 186 and 188 to provide additional contouring and comfort. In the central portion 190 on FIG. 9 the flexible strap 180 is shown closely adjacent the flexible strap 142. However, the adjustable connecting provided by the double "D" rings allows enough "slack" so that flexible strap 180 may be spaced from flexible strap 142 in the central portion 190 as indicated by the dotted line 180'. In such a condition, a resilient pad may be placed in the space 192.

Control means, generally designated 200, are also provided in embodiment 100 for increasing the number of contour configurations which may be achieved by the present invention. As shown on FIG. 9, the control means 200 comprises a third flexible strap means 202 which may be fabricated of nylon webbing or other suitable material having a first end 204 adjustably connected by the double "D" rings 172 to the second end 156 of one of the pairs of first tab means 152 and a second end 204 adjustably connected by double "D" rings 172 to the second end 156 of the other of the pair of tab means 152. The third flexible strap means 202 extends between the first rigid brace members 114 of the first rigid support element 110 and second rigid support element 112. The third flexible strap means 202 is preferably provided aligned with and adjacent to each of the first and second flexible strap means 142 and 180, respectively, and is positioned in the direction 140 therefrom.

The control means 200 further comprises slide fastener means 206 comprised of slide fastener elements 208 and 210 slidably mounted on first flexible strap means 142, second flexible strap means 180 and third flexible strap means 202.

The control means 200 also further comprises a fourth plurality of adjustably length flexible strap means 212 comprised, in the embodiment 100, of a pair of adjustable length flexible strap members 214 and 216. The adjustment in the lengths of the flexible strap members 214 and 216 is provided by the double "D" rings 172 connecting the ends thereof together. Each of the flexible strap member 216 and 214 extend around one of the fifth and sixth rigid brace members 136 and 140, respectively, and to the slide fasteners 210 and 208, respectively. Adjustment of the lengths of the fifth and sixth flexible strap members moves the slide fasteners 208 and 210 in the directions indicated by the arrows 134 and 140 to provide additional contouring capability and sliding the slide fasteners 210 and 208 in the direction indicated by the arrow 220 on FIG. 9 further increasing the number of three dimensional configurations available in the practice of the present invention.

In the embodiment of the seating arrangement 10 described above the frame 12 is illustrated by including the back portion 14 with the two spaced apart rigid support elements 18 and 20. Similarly the seat position 16 is illustrated by including the spaced apart rigid support elements 26 and 28. It has been found, however, that in some applications, rather than providing the two spaced apart rigid support elements 14 and 20, each having rigid brace members 22 and 24 in spaced apart relationship, it may be advantageous to have the back portion comprised of two rigid, spaced apart plate-like members.

Figure 10:
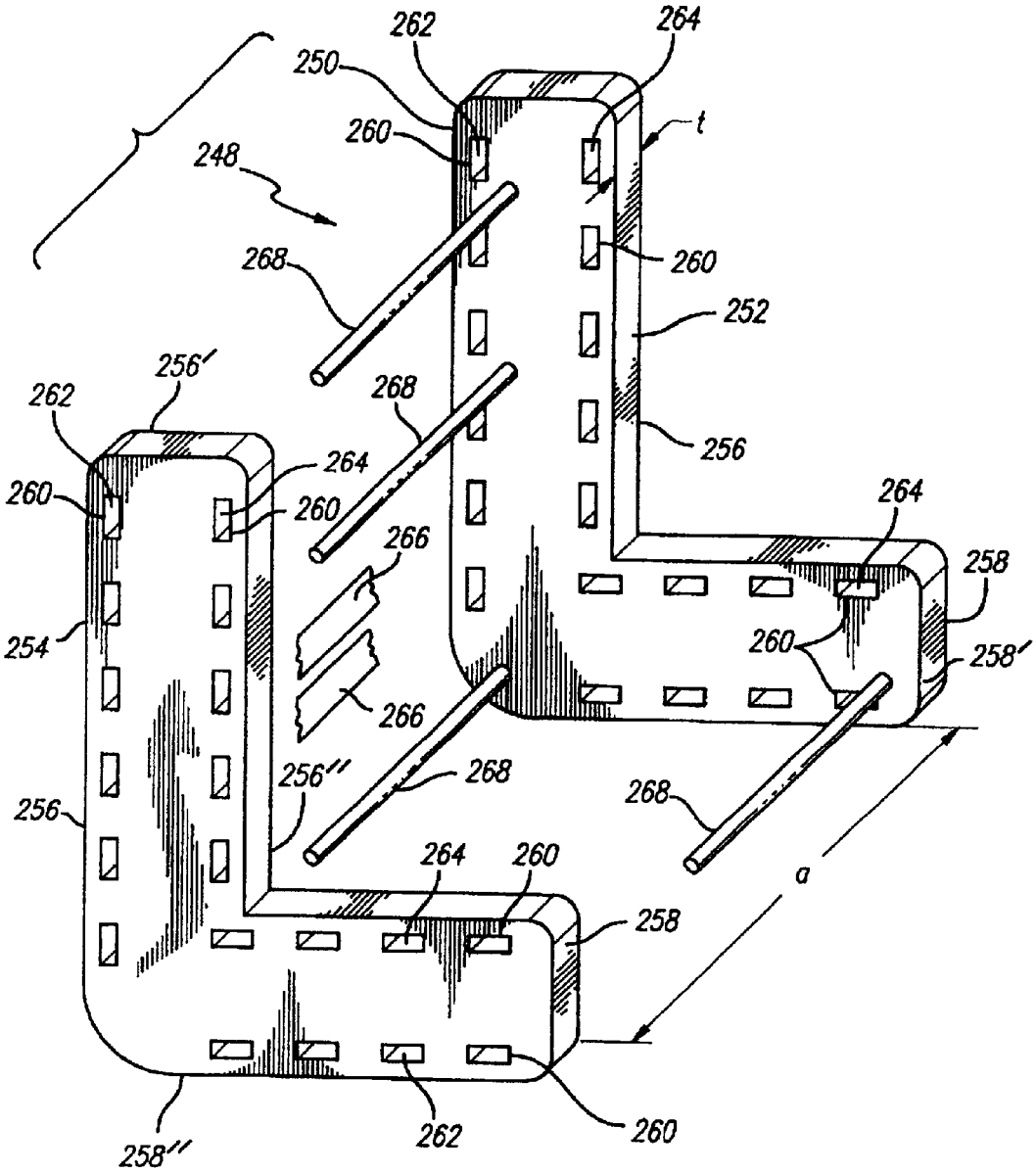
FIG. 10 illustrates another embodiment of the present invention.

FIG. 10 illustrates an embodiment 248 having a frame generally designated 250 which may be utilized in the practice of the various embodiments of the present invention. The frame 250 has two rigid spaced apart support elements 252 and 254 which may be considered rigid side members of frame 250 and each of which has a back portion 256 and a seat portion 258. The rigid support element or side members 252 and 254 may be fabricated of wood, metal, plastic or other materials suitable for the purpose and have a thickness, indicated by the letter "t" sufficient to provide the desired strength and rigidity for the anticipated uses. The side members 252 and 254 may be substantially identical to each other and are provided with walls 260 defining spaced apart rows of a plurality of apertures 262 and 264 in the back portion 256 and the seat portion 258.

A plurality of flexible webbing members 266 which may be substantially similar to the flexible webbing members 52 described above and provided with appropriate double "D" rings (omitted for clarity) for length and contour adjustment. The flexible webbing members 266 may be inserted through corresponding apertures 260 in each of the side members 252 and 254 in the manner described above for flexible webbing members 52.

A plurality of rigid, transverse brace members 268 which may be fabricated from any suitable material such as wood, plastic, metal or the like, interconnect the two side members 252 and 254 to maintain the desired spacing "a" therebetween. The side members 252 and 254 provide the same function and purpose as the two rigid spaced apart support elements 18 and 20 of the embodiment 10.

The flexible webbing members 266 may extend in the back portion 256 from regions near the top 256' to regions near the bottom 256". Similarly, the flexible webbing members 266 may extend from regions adjacent the front 258' of the seat portion 258 to regions adjacent the rear 258" thereof. The flexible webbing members 266 may be adjusted to provide the desired contours and configurations for various applications.

In some applications of the present invention it may be desirable to provide the structure with the capability of being folded so that the seat structure may be conveniently stored and/or carried when not in use. It has been found that such foldable capability may be achieved, for example, by providing lockable hinges in the rigid transverse members.

Figure 11:
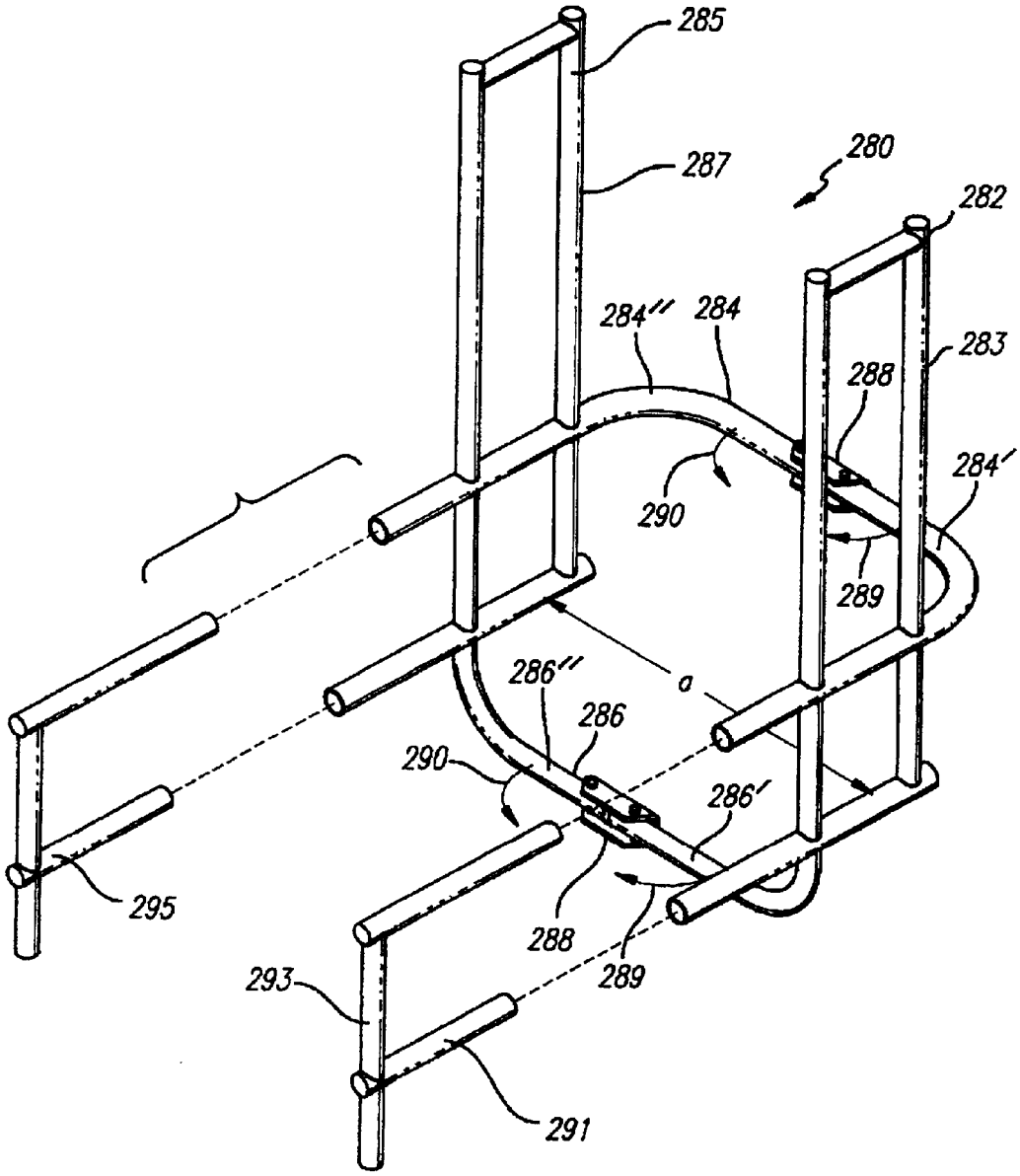
FIG. 11 illustrates another embodiment of the present invention.
Figure 12:
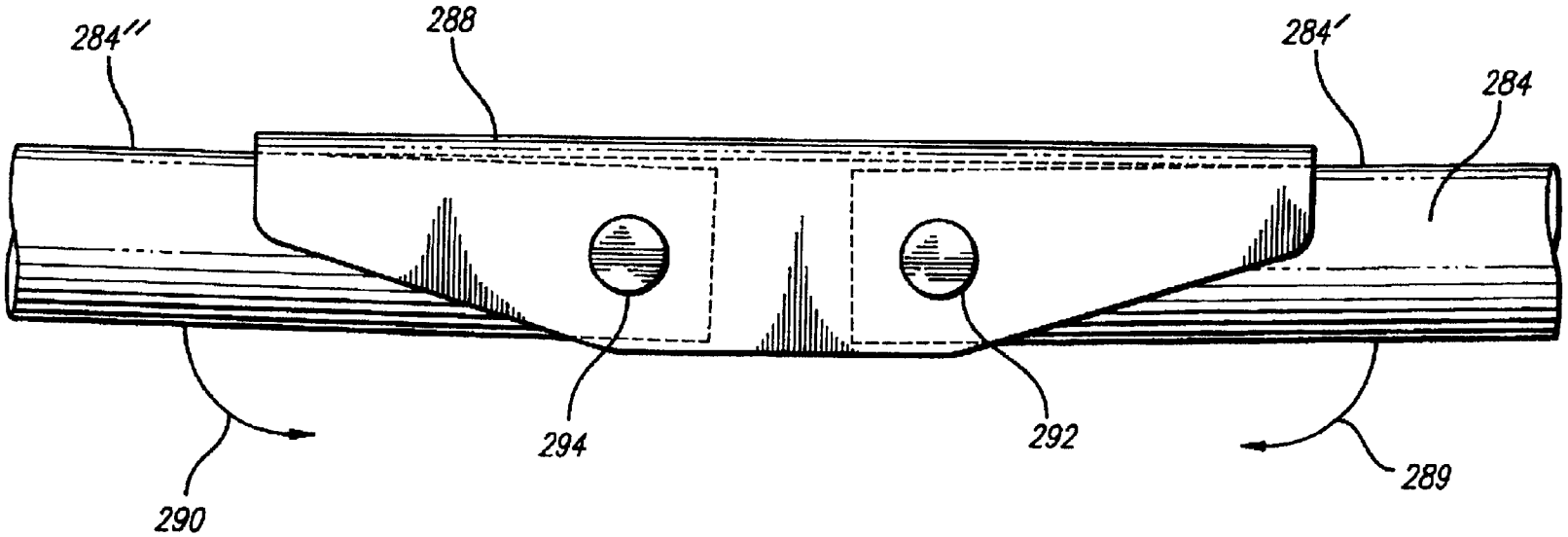
FIG. 12 illustrates another embodiment of the present invention.

FIGS. 11 and 12 illustrate a foldable embodiment generally designated 280 of the present invention. The flexible webbing has been omitted for clarity in illustrating the structure of the frame 282 of embodiment 80. In FIG. 11, which is a partially exploded view, the frame 282 is generally similar to frame 12 of the embodiment 10 described above. The frame 282 has the two rigid support elements 283 and 285, which are generally similar to rigid support elements 18 and 20, in the back portion 287 thereof in spaced apart relationship indicated by the letter "a". The frame 282 is also provided with a seat portion 291 and has rigid support elements 293 and 295 which are generally similar to the rigid support elements 26 and 28 of the embodiment 10 described above. To provide the folding, the rigid transverse members illustrated at 284 and 286 are provided with toggle lock hinges 288. The toggle lock hinges 288 may be of conventional design providing a rigid brace in the position illustrated in FIGS. 11 and 12 but allowing pivoting of the rigid transverse brace portions 284' and 284" as well as 286' and 286" in the directions indicated by the arrows 289 and 290 as there is pivotal motion about the pivots indicated at 292 and 294 (FIG. 12).

The pivotal motion about the pivots 292 and 294 in the directions indicated by the arrows 289 and 290 provide the close juxtapositions of rigid support elements 283 to rigid support element 285 of the back portion 287 and close juxtaposition of rigid support element 293 to rigid support element 295 of seat portion 291.

In the foldable embodiments of the present invention, each of the rigid transverse members are provided with the toggle lock hinges 288. The positioning of the transverse members is selected so that there is no interference therebetween during the folding.

The folding capability of the present invention may also be achieved in the embodiment 248 described above in connection with FIG. 10. In such an embodiment 268 the rigid transverse members thereof are provided with toggle lock hinges such as toggle lock hinges 288 of FIG. 11 so that the rigid support elements or side members 252 and 254 may be moved into close juxtaposition.

Similarly, folding capability may be provided in the other embodiments of the invention as desired for particular applications.

The principles of the present invention may be achieved by various configurations of webbing extending between the rigid side members in a back portion and a seat portion of a chair to provide the three-dimensional contour variations. The various frame members of the embodiments described may be utilized in combination with various webbing configurations.

Figure 13:
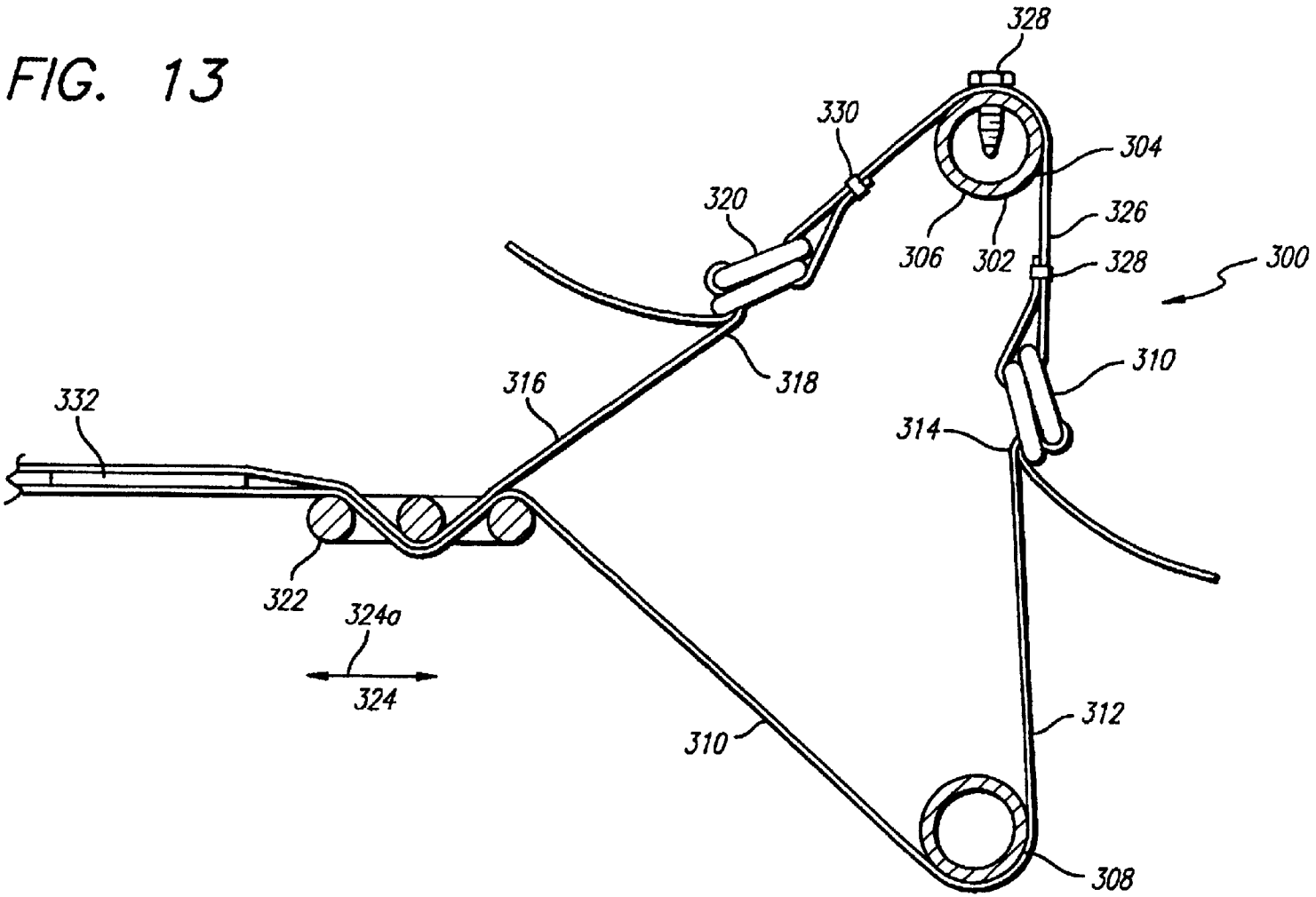
FIG. 13 illustrates another embodiment of the present invention.

FIG. 13 illustrates, partially in schematic form, an embodiment, generally designated 300, of the present invention. In embodiment 300 there is a frame generally designated 301. The frame member 302 is generally similar to frame member 12 of embodiment 10 described above. In FIG. 13, only one half of the structure is shown. The other half of the structure may be identical to the structure shown. The frame 302 has a first rigid support element 304 has a first rigid brace member 306 and second rigid brace member 308 which are similar to first and second rigid brace members 22 and 24 described above.

A plurality of flexible webbing members, generally designated 310 are provided on frame member 302 in a spaced array as described above for the webbing members 52 in embodiment 10.

Each flexible webbing member 310 has a first flexible webbing portion 312 having a first end 314 attached to a pair of "D" rings 317. Each flexible webbing member 310 also is provided with a second flexible webbing portion 316 having a first end 318 connected to "D" rings 320. The first flexible webbing portion 312 extends from the first end 314 thereof around second rigid brace member 308 and through a slide fastener 322 which may be similar to slide fasteners 208 and 210 described above, and is movable in the directions indicated by the arrow 324. The second flexible webbing portion 316 extends from the first end 318 thereof through the slide fastener 322.

A flexible tension strap 326 is connected to first rigid brace member 306 by, for example, screw 328. Rivets, bolts and nuts of any other desired fasteners may be substituted for the screw 328 to secure tension strap 326 to the first rigid brace member 306. The tension strap 326 has a first end 328 connected to the "D" rings 316 and a second end 330 connected to the "D" rings at 320.

In embodiment 300, there is also provided joining means 332 which may be similar to the joining means 68 described above as shown in embodiment 10. The joining means 332 limits the movement of slide fastener 322 in the direction indicated by 324a.

By movement of the slide fastener 322 and, if desired, lengthening or shortening either or both first flexible webbing portion 312 and second flexible webbing portion 316 at "D" rings 317 and 320, respectively, the contour of the webbing member 310 may be changed to provide various configurations thereof.

Figure 14:
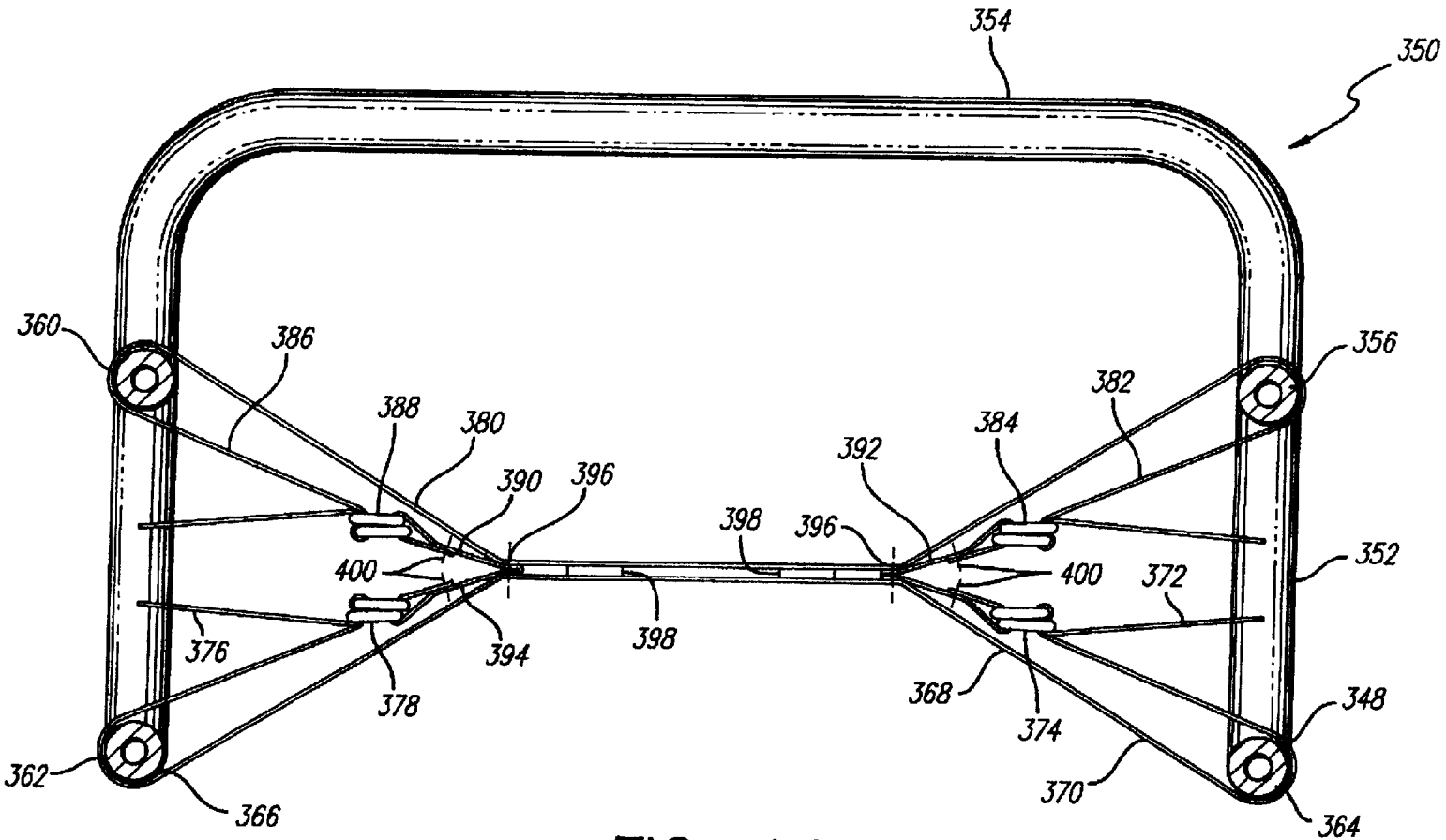
FIG. 14 illustrates another embodiment of the present invention.

FIG. 14 illustrates another embodiment, generally designated 350 of a webbing arrangement useful in the practice of the present invention. In embodiment 350 a frame 352, which may be similar to the frame member 104 of embodiment 100, but the fifth and sixth rigid brace members may be omitted, if desired. That is, the transverse member 354 is not coplanar with first rigid brace member 356 of first rigid support element 358 and first rigid brace member 360 of second rigid support element 362. The frame 352 also is provided with second rigid brace members 364 and 366 of first rigid support element 358 and second rigid support element 362, respectively.

A plurality of flexible webbing members 368 are provided on the frame 352 in spaced apart relationship as described above. The flexible webbing members 308 are comprised of a first flexible webbing portion 370 having a first end 372 connected to "D" rings 374. The first flexible webbing portion 370 extends from the "D" rings 374, around second rigid brace member 364, around second rigid brace member 366 to second end 376 to "D" rings 378.

A second flexible webbing portion 380 is provided and extends from a first end 382 thereof through "D" rings 384, around first rigid brace member 356 and 360 to second end 386 connected to "D" rings 388.

A flexible tension strap means 390, which may be similar to tension strap 326 described above in embodiment 310, is provided and has tension strap member 392 on one side and tension strap member 394 at the other side of the frame 352. Tension strap member 392 connects the first end 372 of first flexible webbing portion 370 of "D" rings 374 and the first end 382 of second webbing portion 380 at "D" rings 384. Similarly, tension strap member 394 connects the second end 376 of first webbing portion 370 at "D" rings 378 and second end 386 of second flexible webbing portion 380 at "D" rings 388.

The tension strap means 396 may be connected, for example, by sewing, though other connecting means such as rivets, bolts or the like may be used at the places indicated generally at 396.

If desired, joining means 398, which may be similar to joining means 68 described above, may be provided for connecting the plurality of flexible webbing members 368.

The remote ends of the tension strap members 392 and 394 may be connected, for example, by sewing, adjacent the connections to the various "D" rings, as indicated at 400.

By adjusting the lengths of first and second flexible webbing portions 370 and 380 at the "D" ring connections, variations in the contour may be achieved.

The configurations of the various flexible webbing members illustrated in the various embodiments of the present invention may be utilized in various combinations on the seat portion and the back portion of each embodiment. Similarly, if desired, various flexible webbing members may be incorporated, if desired, in any back portion or seat portion to allow particular configurations to be achieved for specific application. For example, the flexible webbing member 348 of embodiment 350 may be interspersed with flexible strap means 142 of embodiment 100 in any desired variety of combinations to achieve a particular contour configuration.

The various frame structures illustrated in the various embodiments of the present invention may be utilized with various webbing configurations to provide a seating arrangement as desired for particular applications.

Figure 15:
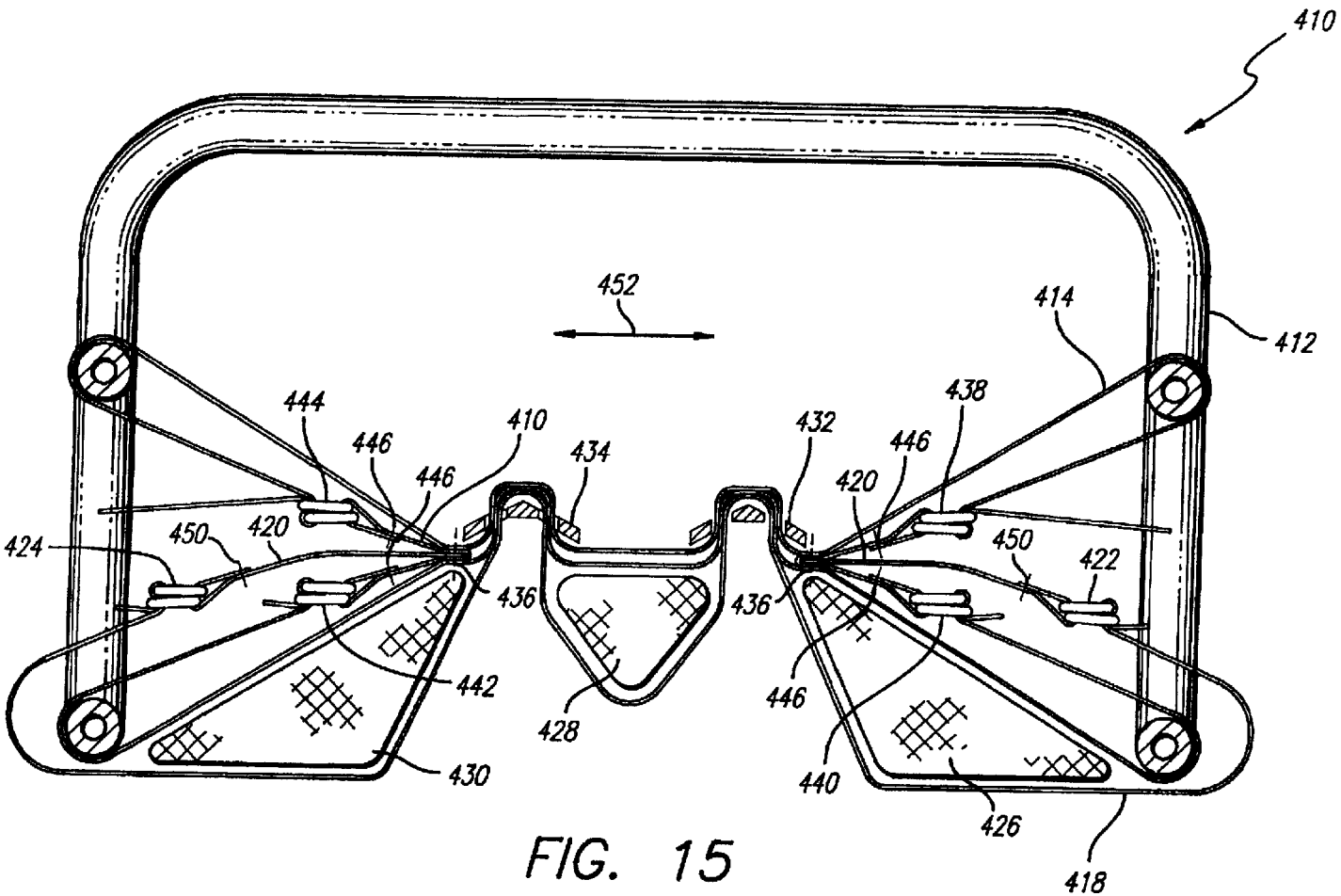
FIG. 15 illustrates another embodiment of the present invention.

FIG. 15 illustrates another embodiment generally designated 410 which combines various webbing configurations of the embodiments described above to achieve the variable configurations desired. As shown on FIG. 15 there is a frame generally designated 412 and a plurality of flexible webbing members 414 which may be the same as the frame 352 and flexible webbing members 368 described above in connection with embodiment 350 shown on FIG. 14. In embodiment 410 there is also provided tension strap means 416 which may be similar to tension strap means 390 described above.

In embodiment 410, there is provided a plurality of flexible strap means 418 which is similar to the plurality of flexible strap means 180 shown in embodiment 200 on FIG. 9. As shown on FIG. 15, the flexible strap means 418 is shown in a slack condition and has a first end coupled to auxiliary tension strap means 420 at "D" rings 422 and 424. The provision of flexible strap means 418 allows incorporation of pads, generally indicated at 426, 428 and 430 to provide additional contour configurations. Slide fasteners 422 and 434 may also be provided for further contour variations as desired. The flexible strap means 418 and flexible webbing members 414 extend through the slide fasteners 432 and 434. Each of the flexible strap means 418, flexible webbing members 424, tension straps 420 and auxiliary tension strap means 420 are connected together as indicated at 436. Similarly, tension strap means 420 have there remote ends connected at the "D" rings 438, 440, 442 and 444 which provides the connections to the flexible webbing members 414 as indicated at 446. Similarly, the remote ends of auxiliary tension strap means 420 are connected together as indicated at 450. The connections at 436, 446 and 450 may be by sewing, rivets, bolts or the like. The position of the connections shown at 436 relative to the frame 412 provides the limited to lateral movement of slide fasteners 432 and 434 in the directions indicated by the arrow 452.

Figure 16:
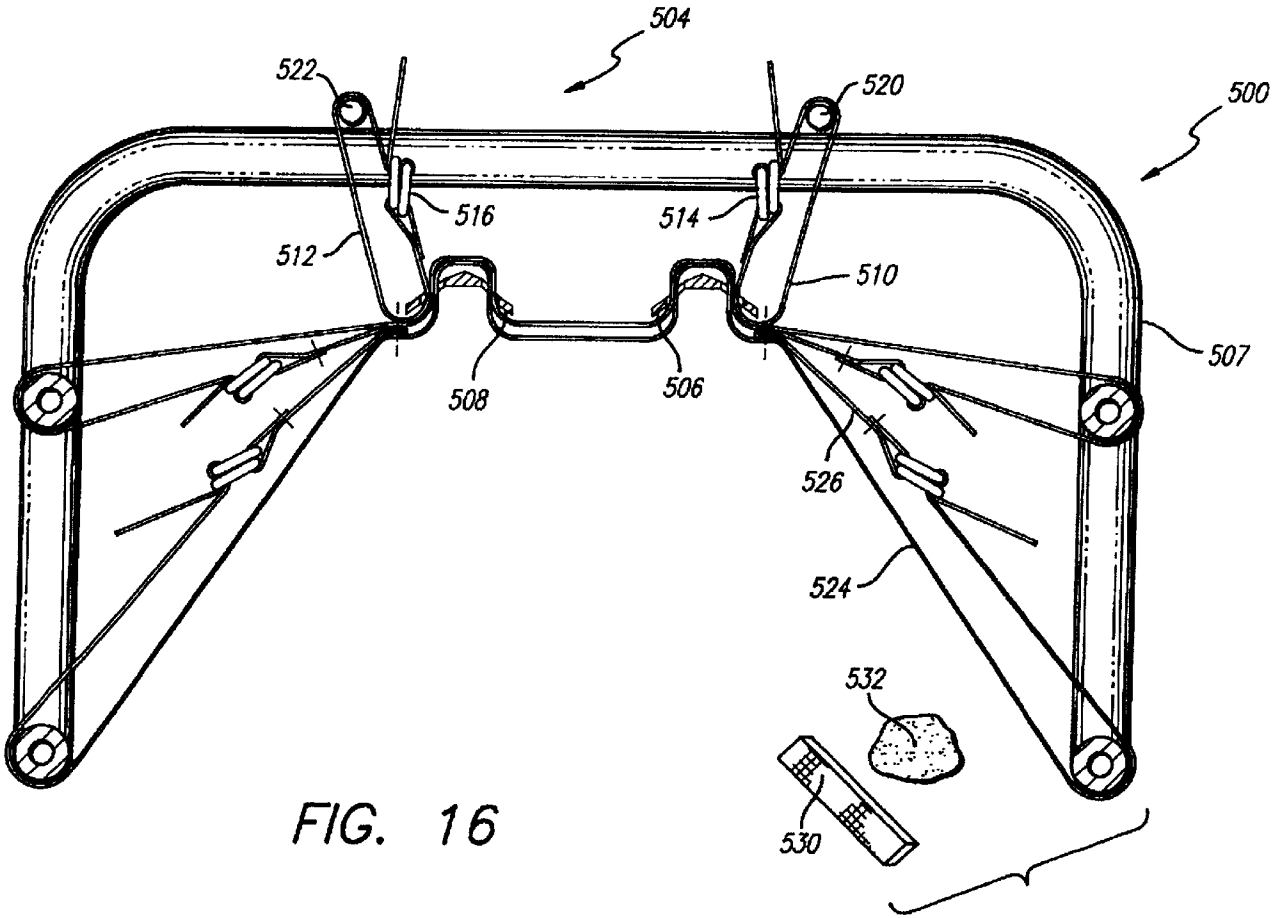
FIG. 16 illustrates another embodiment of the present invention.

FIG. 16 illustrates another embodiment, generally designated 500 according to the principles of the present invention which incorporates various structural elements of the various embodiments described above.

Embodiment 500 is provided with a frame 502 which may be similar to the frame member 104 described above in connection with embodiment 100 descried above in connection with FIGS. 6, 7, 8 and 9 and also incorporates control means 504 which may be generally similar to control means 200 in embodiment 100 and comprises slide fasteners 506 and 508 and adjustable length strap means 510 and 512 connected to double "D" rings 514 and 516 and to the slide fasteners 506 and 508, respectively. The adjustable length strap means 510 and 512 engage a rigid support element 518 comprising rigid brace 520 and 522, respectively.

The embodiment 500 is provided with a plurality of flexible webbing members 524 which may be similar to the flexible webbing member 368 of embodiment 350 described above and tension strap means 526 which may be similar to tension strap means 390 of embodiment 350.

Adjustment of the length of the various portions of flexible webbing member 524 and the strap means 510 and 512 as well as the position of slide fasteners 506 and 508 provides the variations in contour according to the principles of the present invention.

A further modification of the embodiment 500 may be provided by the addition of flexible strap means 530 which may be the same as flexible strap means 418 of embodiment 410 described above to allow positioning, for example, pads 532 in a manner similar to the pads 426, 428 and 430 described above. Auxiliary tension strap means 534 may also be provided and is the same as auxiliary strap means 420 of embodiment 410 and is connected to flexible strap means 530 by "D" rings (not shown).

Each of the embodiments of the present invention may include various coverings over all or part, as desired, of the back portions and seat portions. Such covering, indicated generally at 600 on FIG. 2 may be cloth, padded cloth, plastic, or any other material suitable for the purpose.

The toggle lock hinge 288 shown in embodiment 280 on FIGS. 11 and 12 provide one arrangement for allowing structure according to the principles of the invention to be arranged into a compact configuration. Such toggle lock hinges provide lateral compactness of the structure. In other applications of the present invention it may be desirable to provide vertical compactness of the back portion and horizontal compactness of the seat portion. Such compactness may be provided by the use of well-known telescoping tubes in the rigid support elements of the back portion and seat portion. Such telescoping tubes may, if desired, also be used in the transverse members in place of or in addition to the toggle locking hinges 288 to provide lateral compactness.

The use of the telescoping tubes in the rigid support elements of the back portion and seat portion of the present invention is readily adapted in those embodiments wherein there is no fixed connection of any portion of the webbing or straps to the frame. Such connection is shown, for example, in the embodiment 300 at the screw 328.

Figure 17:
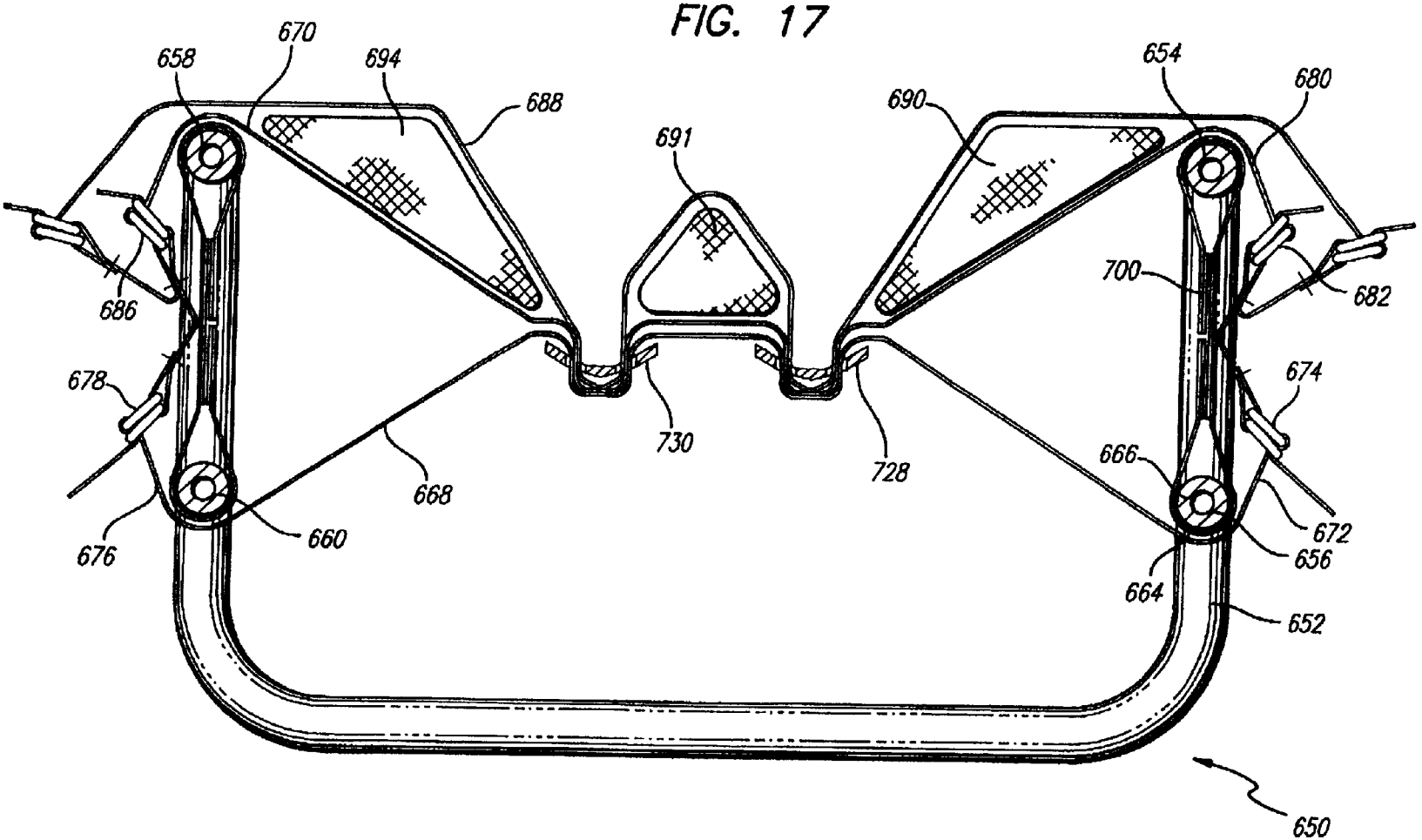
FIGS. 17 and 18 illustrate another embodiment of the present invention.
Figure 18:
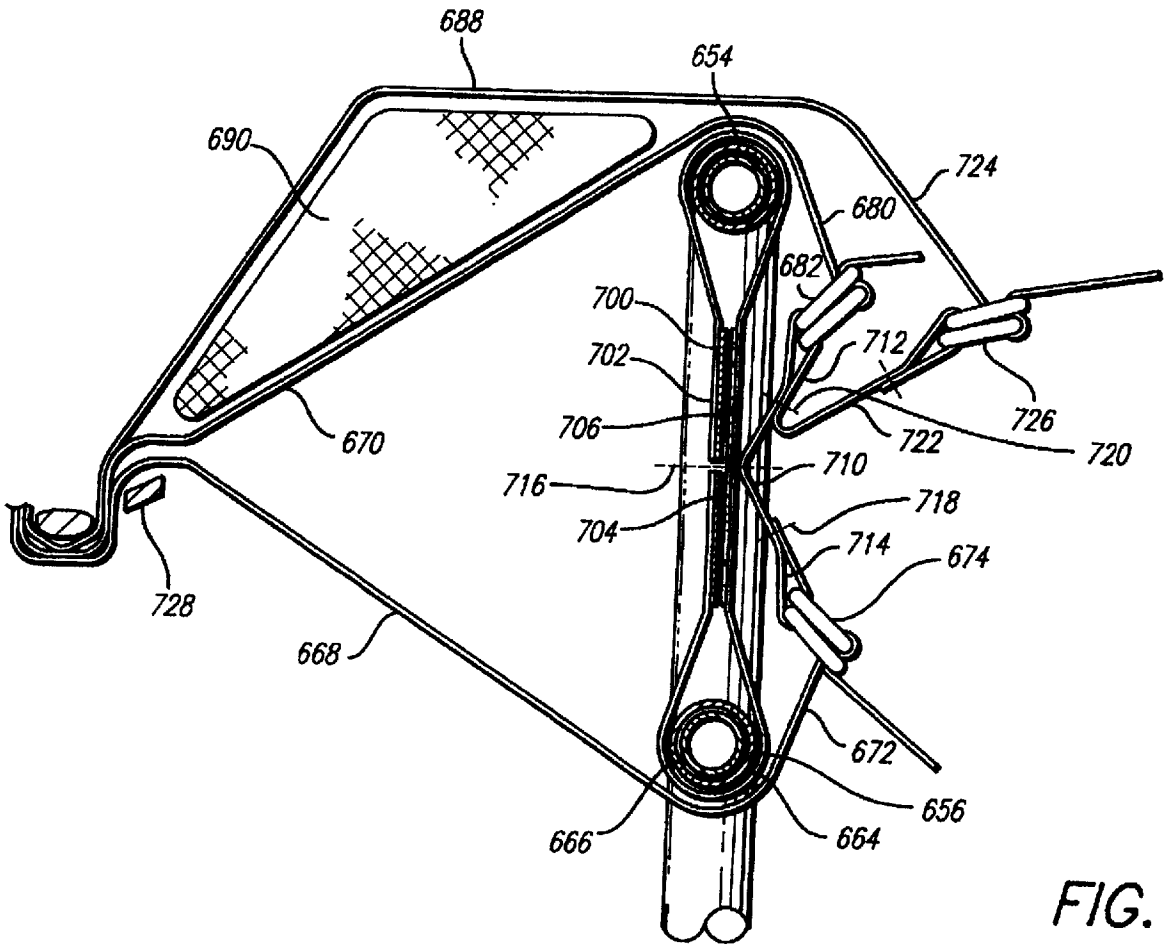

FIGS. 17 and 18 illustrate one embodiment, generally designated 650, of the present invention, incorporating telescoping tubes. As shown on FIGS. 17 and 18, a frame 652 in provided which may be substantially the same as frame 352 of embodiment 350 shown on FIG. 14. However, the rigid brace members 654, 656, 658 and 660 are telescoping tubes utilizing well-known telescoping tube structures. Such telescoping tube structures as utilized in rigid brace members 654, 656, 568 and 660 comprise an outer housing tube 664 and an inner telescoping tube 666. The inner tube 666 is slidably mounted in the housing tube 664 for reciprocal sliding movement therein into and out of the plane of the paper. Well-known spring loaded detent structures (not shown) may be utilized to retain the relative position of the inner tube 666 at various locations in housing tube 664.

Adjustable contours of the back portion and/or seat portion of the frame 652 may be provided in embodiment 650 by the use of a plurality of flexible webbing members 668 and 670. Flexible webbing member 668 has a first end 672 around rigid brace member 656 and connected to "D" rings 674. The second end 676 of flexible webbing member 668 is around rigid brace member 660 and is connected to "D" rings 678.

Similarly, flexible webbing member 670 has a first end 680 around rigid brace member 654 and connected to "D" rings 682. Flexible webbing member 670 has a second end 684 around rigid brace member 658 and connected to "D" rings 686.

A flexible strap means 688 which may be similar to flexible strap means 180 of embodiment 200 shown on FIG. 9 may be utilized to allow positioning of resilient pad means 690, 691 and 694.

Proper length adjustment and tensioning of the flexible webbing members 668 and 670 and flexible strap means 688 are illustrated in the enlarged view shown on FIG. 18. As shown thereon, a control means generally designated 700 is provided for tensioning the flexible webbing members 668 and 670 as well as flexible strap 688.

The control means 700 has an anchor strap 702 encircling rigid brace members 654 and 656 and is, in preferred embodiments of the present invention, detachably secured together by, for example, hook and loop type connection as indicated at 704 for the loop and 706 for the hook. Buckles or other similar connecting means may be used as desired in place of the hook and loop fasteners.

A tension strap 710 has a first end 712 connected to "D" rings 682 for tensioning at the first end 680 of flexible webbing 670. The tension strap 710 has a second end 714 connected to "D" rings 674 for tensioning at the first end 672 of flexible webbing 668. The tension strap 710 is connected, for example, by sewing, as indicated at 716, to anchor strap 702.

The first end 712 and second end 714 of tension strap 710 are connected into a loop at the "D" ring connections, for example, by sewing, as indicated at 718 and 720.

A secondary tension strap 722 may be provided to apply tension to a first end 724 of flexible strap 688 in these embodiments utilizing the flexible strap 688. The secondary tension strap 722 as shown on FIGS. 17 and 18, is connected to "D" rings 726. The second end 724 of flexible strap 688 is also connected to "D" rings 726. The secondary tension strap 722 may be an extension of the first end 712 of tension strap 710 as shown on FIGS. 17 and 18 or, if desired, may be a separate strap connected to anchor strap 702.

The detachable connection of the anchor strap 702 as shown by the hook 706 and loop 704 fastening permits the anchor strap 701 to be loosened when telescoping action of the rigid brace members 654, 656, 658 and 660 is desired. After such telescoping action, the anchor strap may be reconnected to the desired tension to provide the predetermined tensioning of the flexible webbing 668 and 670 and flexible strap 668.

Slide fastener means 728 and 730 may be provided for additional contour adjustment. The flexible webbing 668 and 670 and flexible strap 688 are connected to the slide fasteners 728 and 730 as described above for the slide fasteners 208 and 210 of embodiment 100 shown on FIG. 9.

This concludes the description of the preferred embodiments of the present invention. Those skilled in the art may find many variations and adaptations of the present invention and the following claims are intended to cover all such variations and adaptations falling within the true scope and spirit thereof.

What is claimed:

1. An improved adjustable seating arrangement comprising, in combination:

a frame member having a back portion and a seat portion;

said back portion comprising a first and a second rigid support element, in spaced apart, substantially parallel relationship, each of said first and second rigid support element comprising a first and a second rigid brace member in spaced apart relationship and said first and said second rigid support element defining a plane, said first and said second rigid support elements defining a seating back support;

said seat portion comprising a third and a fourth rigid support element in spaced apart relationship and each of said third and fourth rigid support elements comprising a third and a fourth rigid brace member in spaced apart relationship and said third and said fourth rigid support elements defining a plane, said third and said fourth rigid support elements defining a seating scat support;

at least one rigid transverse member connected to said first rigid brace member of each of said first and said second rigid support elements for maintaining said first and said second rigid support elements in said spaced apart relationship;

a first plurality of flexible webbing members in spaced apart relationship extending between said first and said second rigid support elements, each of said first plurality of webbing members comprising a first and a second flexible webbing portion, each of said first webbing portion of each of said plurality of webbing members having a first end section adjustable connected to said first brace member of said first support element and second end section adjustably connected to said first brace member of said second support element, and said second webbing portions of each of said first plurality of webbing members having a first end section adjustably connected to said second brace member of said first support element and a second end section adjustably connected to said second brace member of said second support element;

at least one flexible back joining means coupled to at least some of said first plurality of webbing members intermediate said first and said second rigid support elements for coupling together at least some of said first and said second webbing sections of said first plurality of said webbing means;

adjustment means in at least some of said first and said second end sections of said first and said second webbing portions of said first plurality of webbing members for varying the length thereof between adjustment means.

2. The arrangement defined in claim 1 wherein:

said plane defined by said first and said second brace members of each of said first and said second support elements are substantially parallel.

3. The arrangement defined in claim 2 wherein:

said first and said second brace members are substantially parallel in at least one of said first and said second support elements.

4. The arrangement defined in claim 3 wherein:

said first and said second brace members are substantially parallel in each of said first and said second support elements.

5. The arrangement defined in claim 1 wherein:

said adjustment means is selected from the class consisting of hook and loop fasteners, buckle fasteners and double "D" ring fasteners.

6. The arrangement defined in claim 1 wherein:

each of said first end section and said second end section of each of said fist and said second webbing portions of said plurality of flexible webbing members is provided with said adjustment means.

7. The arrangement defined in claim 6 wherein said flexible back joining means further comprises:

a pair of spaced apart flexible back joining members.

8. The arrangement defined in claim 7 wherein:

said pair of spaced apart back flexible joining members are substantially parallel.

9. The arrangement defined in claim 8 wherein:

each of said first plurality of flexible webbing members and each of said flexible back joining members are fabric.

10. The arrangement defined in claim 9 wherein:

each of sad flexible back joining means is coupled to said first plurality of flexible webbing members by sewing.

11. The arrangement defined in claim 1 wherein:

each of said first and said second rigid support elements having an upper part and a lower part;

said spaced apart relationship of said first plurality of flexible webbing members is a first predetermined spaced relationship from regions adjacent said upper part to regions adjacent said lower part of each of said first and said second rigid support elements.

12. The arrangement defined in claim 11 wherein:

said third and said fourth rigid support elements of said seat portion are coupled to said first and said second rigid support elements, respectively, in regions adjacent the lower parts thereof.

13. The arrangement defined in claim 12 wherein:

said third and said fourth rigid support members extend outwardly from said first and said second rigid support members.

14. The arrangement defined in claim 13 and further comprising:

second plurality of flexible webbing members in spaced apart relationship extending between said third and said fourth rigid support elements each of said second plurality of webbing members comprising a first and second flexible webbing portion, each of said first webbing portions of said second plurality of webbing members having a first end section adjustably connected to said third brace member of said third support element and a second end section adjustably connected to said third brace member of said fourth rigid support element, and said second portion of each of said second plurality of webbing members having a first end section adjustably connected to said fourth brace member of said third support element and a second end section adjustable connected to said fourth brace member of said fourth rigid support element.

15. The arrangement defined in claim 14 and further comprising:

at least one flexible seat joining means coupled to at least some of said second plurality of webbing members intermediate said third and said fourth rigid support elements four coupling together at least some of said first and said second webbing portions of at least some of said second plurality of webbing members.

16. The arrangement defined in claim 15 and further comprising:

adjustment means in at least some of said first and said second end sections of said first and second webbing portions of said second plurality of webbing members for varying the length thereof between said adjustment means.

17. The arrangement defined in claim 16 wherein:

said plane defined by each of said third and fourth brace members of each of said third and said fourth rigid support elements are substantially parallel; and said first and said second brace members are substantially parallel in each of said first and said second support elements.

18. The arrangement defined in claim 17 wherein:

said third and said fourth rigid support elements extend substantially at right angles to said first and said second rigid support elements, respectively.

19. The arrangement defined in claim 18 wherein:

each of said first plurality of webbing members is substantially similar to each other;

each of said second plurality of webbing members is substantially similar to each other;

each of said first rigid support element is substantially similar to said second rigid support element; and said third rigid support element is substantially similar to said fourth rigid support element.

20. The arrangement defined in claim 19 wherein:

each of said first plurality of webbing members is substantially similar to each of said second plurality of webbing members; and each of first and said second rigid support elements are substantially similar to each of said third and said fourth rigid support elements.

21. The arrangement defined in claim 20 wherein:

said adjustment means is selected from the class consisting of hook and loop fasteners, buckle fasteners and double "D" ring fasteners.

22. The arrangement defined in claim 21 wherein:

each of said first end section and said second end section of each of said first and said second webbing portions of said plurality of flexible webbing members is provided with said adjustment means; and each of said first end section and said second end section of each of said first and said second webbing portions of said second plurality of flexible webbing members is provided with said adjustment means.

23. The arrangement defined in claim 22 wherein:

said flexible seat joining means further comprises:

a pair of spaced apart flexible seat joining members; and further comprising:

a pair of spaced apart flexible back joining members.

24. The arrangement defined in claim 23 wherein:

said pair of spaced apart flexible seat joining members are substantially parallel; and said pair of spaced apart back flexible joining members are substantially parallel.

25. The arrangement defined in claim 24 wherein:

each of said pair of flexible seat joining members and each of said second plurality of flexible webbing members are fabric; and each of said first plurality of flexible webbing members and each of said flexible back joining members are fabric.

26. The arrangement defined in claim 18 wherein:

each of said third and said fourth rigid support elements has an inner end and an outer end spaced from said inner end;

said inner ends of said third and said fourth rigid support elements are coupled to said first and said second rigid support elements, respectively.

27. The arrangement defined in claim 26 wherein:

said second plurality of flexible webbing members is in a second preselected spaced array between said inner end and said outer end of said third and said fourth rigid support elements.

28. The arrangement defined in claim 27 wherein:

said seat joining means are coupled to said back joining means in regions intermediate said inner ends at said third and said fourth rigid support elements.

29. The arrangement defined in claim 28 wherein:

said at least one of said transverse member is coupled to said first and said second rigid support elements in regions adjacent said inner ends of said third and said fourth rigid support elements.

30. The arrangement defined in claim 29 wherein:

at least some of said adjustment means are double "d" rings.

*31. An adjustable seating arrangement for use in a wheelchair or stroller comprising:*

*a frame member having a back portion and a seat portion;*

*a plurality of rigid support elements, the plurality of rigid support elements including a first and a second rigid support element in spaced apart, substantially parallel relationship defining a seating side support of the back portion, a third and a fourth rigid support element in spaced apart relationship defining a seating side support of the seat portion;*

*a first rigid transverse member connected to said first and said second rigid support elements to maintain said first and said second rigid support elements in said spaced apart relationship, and a second rigid transverse member connected to said third and said fourth rigid support elements to maintain said third and said fourth rigid support elements in said spaced apart relationship;*

*a first flexible webbing member extending between said first and said second rigid support elements and adjustably connected to said first support element and said second support element, the first flexible webbing member having a plurality of webbing portions including a first webbing portion and a second webbing portion;*

*at least one flexible back joining portion coupled to at least some of said plurality of webbing portions intermediate said first and said second rigid support elements for coupling together said at least some of said plurality of webbing portions; and*

*at least one adjustment mechanism for providing an adjustable connection of said plurality of webbing portions to said first and second rigid support elements, and for varying the length of said first flexible webbing member between said first and second rigid support elements,*

*wherein said first and second rigid support elements each include a first and second rigid brace member in spaced apart relationship with each other, said first and second rigid brace members of each of said first and said second rigid support element defining a plane.*

*32. The adjustable seating arrangement of claim 31, wherein said planes defined by said first and said second brace members of each of said first and said second rigid support elements are substantially parallel.*

*33. The adjustable seating arrangement of claim 31, wherein said first and said second brace members are substantially parallel in at least one of said first and said second rigid support elements.*

*34. The adjustable seating arrangement of claim 31, wherein said first and said second brace members are substantially parallel in each of said first and said second rigid support elements.*

*35. The adjustment seating arrangement of claim 31, wherein said first webbing portion includes a first end section adjustable connected to said first brace member of said first support element and a second end section adjustable connected to said first brace member of said second rigid support element, and said second webbing portion includes a first end section adjustably connected to said second brace member of said first rigid support element and a second end section adjustably connected to said second brace member of said second rigid support element.*

*36. The adjustable seating arrangement of claim 35, wherein said first end section and said second end section of each of said first and said second webbing portions includes an adjustment mechanism.*

*37. The adjustable seating arrangement of claim 35, wherein said third and fourth rigid support elements each include a third and fourth rigid brace member in spaced apart relationship with each other and further comprising a second flexible webbing member in spaced apart relationship extending between said third and said fourth rigid support elements, said second flexible webbing member having a plurality of webbing portions including a first and a second webbing portion, said first webbing portion of said second flexible webbing member having a first end section adjustable connected to said third brace member of said third rigid support element and a second end section adjustable connected to said third brace member of said fourth rigid support element, and said second webbing portion of said second flexible webbing member having a first end section adjustable connected to said fourth brace member of said third rigid support element and a second end section adjustable connected to said fourth brace member of said fourth rigid support element.*

*38. The adjustable seating arrangement of claim 37, further comprising at least one flexible seat joining portion coupling together at least some of said plurality of webbing portions between said third and fourth rigid support elements.*

*39. The adjustable seating arrangement of claim 38, further comprising at least one adjustment mechanism in at least some of said first and said second end sections of said first and second webbing portions of said second plurality of webbing members for varying the length thereof between said third and fourth rigid support elements.*

*40. The adjustable seating arrangement of claim 39, wherein said third and said fourth support elements extend substantially at right angles to said first and said second rigid support elements, respectively.*

*41. The adjustable seating arrangement of claim 40, wherein each of said third and fourth rigid support elements has an inner end and an outer end spaced from said inner end, said inner ends of said third and fourth rigid support elements being coupled to said first and said second rigid support elements, respectively.*

*42. The adjustable seating arrangement of claim 38, wherein said first end section and said second end section of each of said first and said second webbing portions of said first flexible webbing member include an adjustment mechanism, and wherein said first end section and said second end section of each of said first and said second webbing portions of said second flexible webbing member include an adjustment mechanism.*

*43. The adjustable seating arrangement of claim 42, wherein said flexible seat joining portion further comprises a pair of spaced apart flexible seat joining members.*

*44. The adjustable seating arrangement of claim 43, wherein said pair of spaced apart flexible seat joining members are substantially parallel.*

*45. An adjustable seating arrangement for use in a wheelchair or stroller, comprising:*

*a frame member having a back portion and a seat portion;*

*a plurality of rigid support elements, the plurality of rigid support elements including a first and a second rigid support element in spaced apart, substantially parallel relationship defining a seating side support of the back portion, and a third and a fourth rigid support element in spaced apart relationship defining a seating side support of the seat portion;*

*a first rigid transverse member connected to said first and said second rigid support elements in said spaced apart relationship, and a second rigid transverse member*

*connected to said third and said fourth rigid support elements to maintain said third and said fourth rigid support elements in said spaced apart relationship;*

*a first flexible webbing member extending between said first and said second rigid support elements and adjustably connected to said first support element and said second support element, the first flexible webbing member having a plurality of webbing portions including a first webbing portion and a second webbing portion;*

*at least one flexible back joining portion coupled to at least some of said plurality of webbing portions intermediate said first and said second rigid support elements for coupling together said at least some of said plurality of webbing portions;*

*at least one adjustment mechanism for providing an adjustable connection of said plurality of webbing portions to said first and second rigid support elements, and for varying the length of said first flexible webbing member between said first and second rigid support elements; and*

*wherein said third and fourth rigid support elements each include a third and fourth rigid brace member in spaced apart relationship with each other, said third and fourth rigid brace members of each of said third and said fourth rigid support elements defining a plane.*

* * * * *